United States Patent
Sillard et al.

(10) Patent No.: US 6,612,756 B1
(45) Date of Patent: Sep. 2, 2003

(54) DISPERSION SHIFTED FIBER FOR WAVELENGTH DIVISION MULTIPLEX FIBER OPTIC TRANSMISSION SYSTEMS

(75) Inventors: Pierre Sillard, Paris (FR); Louis-Anne de Montmorillon, Paris (FR); Ludovic Fleury, Bois d'Arcy (FR); Pascale Nouchi, Maisons Laffitte (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/471,025

(22) Filed: Dec. 23, 1999

(30) Foreign Application Priority Data

Nov. 25, 1999 (FR) .............................. 99 14829

(51) Int. Cl.$^7$ ................................. G02B 6/22
(52) U.S. Cl. ................ 398/148; 385/123; 385/124; 385/126
(58) Field of Search ................ 385/123, 124, 385/126; 359/161

(56) References Cited

U.S. PATENT DOCUMENTS

| | | | | |
|---|---|---|---|---|
| 4,447,125 A | * | 5/1984 | Lazay et al. ............... | 385/123 |
| 6,157,754 A | * | 12/2000 | Sasaoka et al. ............. | 359/159 |
| 6,205,279 B1 | * | 3/2001 | Kim et al. .................. | 385/124 |
| 6,243,522 B1 | * | 6/2001 | Allan et al. ................. | 385/123 |
| 6,263,138 B1 | * | 7/2001 | Sillard et al. ............... | 385/123 |
| 6,275,638 B1 | * | 8/2001 | Sasaoka et al. ............. | 385/127 |
| RE37,457 E | * | 11/2001 | Nouchi et al. .............. | 359/161 |
| 6,337,942 B1 | * | 1/2002 | Kato et al. .................. | 385/126 |

* cited by examiner

Primary Examiner—Jason Chan
Assistant Examiner—David C Payne
(74) Attorney, Agent, or Firm—Sughrue Mion, PLLC

(57) ABSTRACT

An in-cable monomode optical fiber has a step and ring index profile and, for a wavelength of 1,550 nm:

an effective surface area greater than or equal to 60 $\mu m^2$, a chromatic dispersion from 3 to 14 ps/(nm.km), a chromatic dispersion slope from 0 to 0.1 ps/(nm$^2$.km), and a ratio between the effective surface area and the chromatic dispersion slope greater than 900 $\mu m^2$.nm$^2$.km/ps.

29 Claims, 1 Drawing Sheet

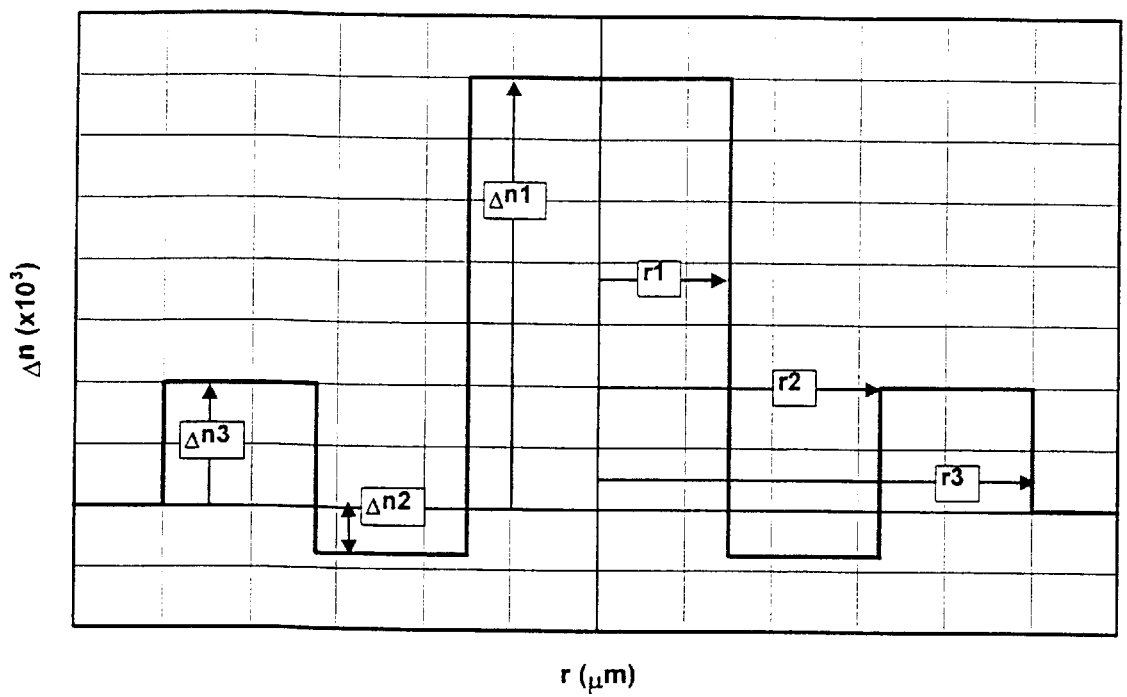
Figure

DISPERSION SHIFTED FIBER FOR WAVELENGTH DIVISION MULTIPLEX FIBER OPTIC TRANSMISSION SYSTEMS

BACKGROUND OF THE INVENTION

1. Field of the Invention

The present invention relates to fiber optic transmission and more particularly to wavelength division multiplex transmission using dispersion shifted fiber as the line fiber.

2. Description of the Prior Art

The index profile of optical fibers is generally characterized as a function of the shape of the graph of the function that associates the radius of the fiber and the refractive index. It is conventional to plot on the abscissa axis the distance r to the center of the fiber and on the ordinate axis the difference between the refractive index and the refractive index of the cladding of the fiber. The expressions "step profile", "trapezium profile" and "triangle profile" are used to refer to graphs which respectively have step, trapezium and triangle shapes. These curves are generally representative of the theoretical profile or set point profile of the fiber and fiber fabrication constraints can yield a substantially different profile.

To use a fiber in a transmission system, and in particular in a wavelength division multiplex transmission system, it is beneficial for the fiber to have a large effective surface area in the range of wavelengths of the multiplex. A large effective surface area limits the power density in the fiber, at total constant power, and limits or prevents undesirable non-linear effects.

For high bit rate systems, it is also beneficial for the fiber to assure monomode propagation of the channels of the multiplex. ITU-T Recommendation G.650 defines the in-cable cut-off wavelength. The theoretical cut-off wavelength of the fiber is generally several hundred nanometers greater than the in-cable cut-off wavelength. It appears that propagation in an optical fiber can be monomode, even if the theoretical cut-off wavelength is greater than the wavelength of the signals used: beyond a distance of a few meters or tens of meters, which is small in comparison with the propagation distances in fiber optic transmission systems, the secondary modes disappear because of excessive attenuation. Propagation in the transmission system is then monomode.

It is also important for the fiber to have as small a sensitivity as possible to curvature and microcurvature. The sensitivity to curvature is evaluated, as explained in ITU-T Recommendation G.650, by measuring the attenuation caused by winding 100 turns of a fiber around a 30 mm diameter spool. The sensitivity to microcurvature is measured in a manner that is well known in the art; as described hereinafter, it can be measured relative to a fiber such as the ASMF 200 fiber manufactured by the assignees of the applicants.

In new high bit rate wavelength division multiplex transmission networks it is advantageous to limit the chromatic dispersion slope in the range of wavelengths of the multiplex; the objective is to minimize distortion between channels of the multiplex during transmission.

Dispersion shifted fibers (DSF) are now commercially available. Their chromatic dispersion is substantially zero at the transmission wavelength at which they are used, which is generally different from the wavelength of 1.3 $\mu$m at which the dispersion of the silica is substantially zero; this means that the non-zero chromatic dispersion of the silica is compensated—whence the use of the term "shifted"—by an increase in the index difference $\Delta n$ between the fiber core and the optical cladding. This index difference shifts the wavelength for zero chromatic dispersion; it is obtained by introducing dopants into the perform during its fabrication, for example by an MCVD process well known in the art and not described in detail here. Non-zero dispersion shifted fibers (NZ-DSF) are dispersion shifted fibers which have non-zero chromatic dispersion at the wavelengths at which they are used. The non-zero chromatic dispersion limits non-linear effects in the fiber and in particular four-wave mixing between the channels of the multiplex. The problem with DSF, as explained in EP-A-0 859 247, is that the chromatic dispersion slope generally increases as the effective surface area increases.

EP-A-0 859 247 describes ring profile DSF and explains that for such fibers there is a range in which the effective surface area and the chromatic dispersion slope vary in different directions. The fibers referred to by way of example have a negative chromatic dispersion in the range −4.5 ps/(nm.km) to −1.0 ps/(nm.km). They have a cut-off wavelength greater than 1500 nm for a fiber length of 2 m. The above document specifies that the high cut-off wavelength is not a problem because the cut-off wavelength decreases with the propagation distance and monomode propagation is assured for transmission distances in the order of 1 000 km.

In the article "Practically feasible dispersion flattened fibers produced by VAD technique," ECOC'98 (p 131–132), Y. Yokohama et al. propose to obtain an effective surface area in the order of 50 $\mu m^2$ and a chromatic dispersion slope in the order of 0.026 ps/(nm$^2$.km) by pushing the cut-off wavelength beyond 1550 nm.

In the article "Maximum effective area for non-zero dispersion-shifted fibers," OFC'98 ThK3, P. Nouchi proposes a comparative study of the maximum effective surface area for different fiber profiles as a function of the curvature losses for fixed values of dispersion and dispersion slope. The above article shows in particular that fibers with a coaxial ring profile and fibers with a coaxial profile have larger effective surface areas, all other things being equal. However, this type of profile is not easy to fabricate, in particular because the central part of the index profile has an index less than or equal to that of the cladding.

Lucent TrueWave/RS fiber has the following specifications:

wavelength $\lambda_o$: 1 468 nm, chromatic dispersion slope at 1550 nm: 0.045 ps/(nm$^2$.km), chromatic dispersion at 1550 nm: 3.7 ps/(nm.km), mode diameter at 1550 nm: 8.4 $\mu$m, effective surface area at 1550 nm: 55 $\mu m^2$.

Corning LEAF NZ-DSF has an effective surface area of 72 $\mu m^2$ at 1550 nm and a chromatic dispersion slope in the order of 0.08 ps/(nm$^2$.km) to 0.09 ps/(nm$^2$.km); the chromatic dispersion is cancelled out at around 1500 nm.

The invention proposes an optical fiber that can be used in a cable and which represents an advantageous compromise between the effective surface area and the chromatic dispersion slope, in particular by virtue of the chosen cut-off wavelength, and which is additionally easy to fabricate.

SUMMARY OF THE INVENTION

To be more precise, the invention consists in an in-cable monomode optical fiber having a step and ring index profile and, for a wavelength of 1550 nm:

an effective surface area greater than or equal to 60 $\mu m^2$,
a chromatic dispersion from 3 to 14 ps/(nm.km),
a chromatic dispersion slope from 0 to 0.1 ps/(nm$^2$.km), and
a ratio between the effective surface area and the chromatic dispersion slope greater than 900 $\mu m^2$.nm$^2$.km/ps.

The fiber of the invention preferably has a chromatic dispersion at 1550 nm from 5 ps/(nm.km) to 11 ps/(nm.km) and/or a chromatic dispersion slope less than 0.07 ps/(nm$^2$.km).

The fiber of the invention preferably has a ratio between the effective surface area and the chromatic dispersion slope greater than or equal to 1 000 $\mu m^2$.nm$^2$.km/ps. This ratio is preferably less than or equal to 5000 $\mu m^2$.nm$^2$.km/ps or even 2 500 $\mu m^2$.nm$^2$.km/ps.

The fiber of the invention preferably has a chromatic dispersion cancellation wavelength $\lambda_o$ less than or equal to 1 480 nm.

In one embodiment of the invention the fiber has an effective surface area greater than or equal to 70 $\mu m^2$.

The fiber of the invention has curvature losses at 1550 nm less than or equal to 0.05 dB and preferably less than or equal to 0.005 dB for 100 turns of fiber wound with a radius of 30 mm. It can also have a sensitivity to microcurvature less than 1.2 and preferably less than 0.8.

The fiber preferably has a theoretical cut-off wavelength greater than 1550 nm and an in-cable cut-off wavelength less than 1 300 nm.

In one embodiment of the invention the fiber has an attenuation at 1550 nm less than or equal to 0.23 dB/km and a polarization modal dispersion less than or equal to 0.1 ps.km$^{-0.5}$.

The difference between the index of the central part of the fiber (step) and the index of the cladding is advantageously from $5 \times 10^{-3}$ to $9 \times 10^{-3}$ and preferably from $6 \times 10^{-3}$ to $7.5 \times 10^{-3}$; the difference between the index of the intermediate segment between the step and the ring and the index of the cladding is from $-4 \times 10^{-3}$ to $1 \times 10^{-3}$ and preferably from $-2.5 \times 10^{-3}$ to $5 \times 10^{-4}$; the difference between the index of the ring and the index of the cladding is from $5 \times 10^{-4}$ to $5 \times 10^{-3}$ and preferably from $1 \times 10^{-3}$ to $3.5 \times 10^{-3}$.

The ratio between the radius of the step and the outside radius of the ring is advantageously from 0.23 to 0.45 and the ratio between the inside radius of the ring and the outside radius of the ring is from 0.45 to 0.75 and preferably from 0.48 to 0.7.

The outside radius of the ring is advantageously from 7 $\mu m$ to 13 $\mu m$ and preferably from 7.5 $\mu m$ to 11.5 $\mu m$.

The invention also proposes a wavelength division multiplex fiber optic transmission system comprising a fiber as defined hereinabove as line fiber. It can then further comprise dispersion compensating fiber.

Other features and advantages of the invention will become apparent on reading the following description of embodiments of the invention given by way of example and with reference to the single FIGURE of the accompanying drawing.

BRIEF DESCRIPTION OF THE DRAWING

The single FIGURE of the accompanying drawing is a diagram showing the step and ring index profile of a fiber in accordance with the invention.

DETAILED DESCRIPTION OF THE PREFERRED EMBODIMENTS

In all the embodiments described, radii r are specified in microns and measured relative to the axis of the fiber. Indices $\Delta n$ are expressed as the difference relative to the index of the cladding of the fiber.

Starting from the center of the fiber, the profile features:

a step central part of radius $r_1$ with an index $\Delta n_1$ which is substantially constant and higher than the index of the cladding, an intermediate annular segment of substantially constant index $\Delta n_2$ less than or greater than the index of the cladding and which extends out to a radius $r_2$, and a ring of substantially constant index $\Delta n_3$ greater than the index of the cladding and which extends out to a radius $r_3$.

The cladding of the fiber surrounds the ring.

Table 1 sets out radius and index values for fibers having this type of step and ring profile.

TABLE 1

| N° | $r_1$ | $r_2$ | $r_3$ | $10^{-3} \cdot \Delta n_1$ | $10^{-3} \cdot \Delta n_2$ | $10^{-3} \cdot \Delta n_3$ |
|---|---|---|---|---|---|---|
| 1 | 3.4 | 5.5 | 8.5 | 7.2 | -2.2 | 3.2 |
| 2 | 2.9 | 6.5 | 10 | 7.5 | 0 | 2.2 |
| 3 | 3.3 | 5.1 | 7.8 | 7.1 | -2.1 | 3.2 |
| 4 | 3.7 | 5.6 | 9 | 6.7 | -3.3 | 2.1 |
| 5 | 3.2 | 5.2 | 10.8 | 6.9 | 0 | 1.2 |
| 6 | 3.3 | 6 | 11.6 | 6.8 | 0 | 1.3 |
| 7 | 3 | 5.1 | 8.7 | 7 | 0.35 | 2.5 |
| 8 | 3.6 | 5.7 | 8.8 | 5.9 | 0 | 2.5 |

The features of fibers in accordance with the invention enable them to be fabricated by conventional methods; by way of comparison, the index difference 1% routinely mentioned in the prior art corresponds to a difference $\Delta n_1$ equal to $14.5 \times 10^{-3}$. It can be seen that the invention does not imply high index values or layers with very small radii and therefore avoids fabrication problems and also excessive attenuation of the fiber.

At 1.55 $\mu m$ the fibers obtained with the above radius and index values have the specifications set out in the corresponding lines of Table 2, except for the theoretical cut-off and chromatic dispersion cancellation wavelengths. The units are as follows:

theoretical cut-off wavelength $\lambda_{cth}$: nm, chromatic dispersion cancellation wavelength $\lambda_o$: nm, chromatic dispersion C: ps/(nm.km), chromatic dispersion slope C': ps/(nm$^2$.km), effective surface area $S_{eff}$: $\mu m^2$, curvature losses PC: dB, microcurvature losses $S_{\mu c}$: none.

(Curvature losses are measured as indicated above by winding 100 turns of the fiber with a 30 mm radius and measuring the induced losses. The microcurvature losses $S_{\mu c}$ are measured relative to the ASMF 200 fiber manufactured by the assignees of the applicants and are dimensionless quantities. The ratio $S_{eff}/C'$ has the dimensions of $\mu m^2$.nm$^2$.km/ps).

TABLE 2

| N° | $\lambda_{cth}$ | $\lambda_0$ | C | C' | $S_{eff}$ | $S_{eff}/C'$ | PC | $S_{\mu c}$ |
|---|---|---|---|---|---|---|---|---|
| 1 | 1700 | 1475 | 4 | 0.054 | 62 | 1150 | <10$^{-5}$ | 0.69 |
| 2 | 1780 | 1475 | 4 | 0.057 | 62 | 1090 | <10$^{-5}$ | 0.71 |
| 3 | 1630 | 1460 | 6 | 0.068 | 68 | 1010 | <10$^{-5}$ | 0.73 |
| 4 | 1550 | 1380 | 8 | 0.048 | 62 | 1290 | <10$^{-5}$ | 0.64 |
| 5 | 1630 | 1410 | 8 | 0.058 | 65 | 1130 | <10$^{-5}$ | 0.67 |
| 6 | 1780 | 1400 | 8 | 0.054 | 65 | 1200 | <10$^{-5}$ | 0.65 |

TABLE 2-continued

| N° | $\lambda_{cth}$ | $\lambda_0$ | C | C' | $S_{eff}$ | $S_{eff}/C'$ | PC | $S_{\mu c}$ |
|---|---|---|---|---|---|---|---|---|
| 7 | 1780 | 1440 | 8 | 0.075 | 78 | 1040 | $<10^{-5}$ | 0.82 |
| 8 | 1780 | 1370 | 12 | 0.067 | 88 | 1310 | $<10^{-5}$ | 0.93 |

In all the examples set out in Table 1, variations of $5\times10^{-4}$ in the indices $\Delta n_1$, $\Delta n_2$ and $\Delta n_3$ yield similar results. Likewise the radii, which can individually vary 10% relative to the values given and yield analogous results.

Profiles other than those described by way of example can be used to produce fibers having the features of the invention. The fiber of the invention can be fabricated by the skilled person using techniques well known in the art, such as MCVD or other techniques routinely used to fabricate optical fibers.

The fiber of the invention can advantageously be used as line fiber in transmission systems, and in particular in wavelength division multiplex transmission systems for the range of wavelengths from 1300 nm to 1 630 nm. In a system using line fiber of this kind, dispersion compensation fiber can be incorporated into the system at regular intervals to limit the cumulative increase of chromatic dispersion along the transmission line.

Of course, the present invention is not limited to the examples and embodiments described and shown and is open to many variants that will be evident to the skilled person.

What is claimed is:

1. An in-cable monomode optical fiber having a step and ring index profile and, for a wavelength of 1550 nm:
    an effective surface area greater than or equal to 60 $\mu m^2$,
    a chromatic dispersion from 3 to 14 ps/(nm.km),
    a chromatic dispersion slope from 0 to 0.1 ps/(nm$^2$.km), and
    a ratio between the effective surface area and the chromatic dispersion slope greater than 900 $\mu m^2$.nm$^2$.km/ps.

2. The fiber claimed in claim 1 having a chromatic dispersion at 1550 nm from 5 ps/(nm.km) to 11 ps/(nm.km).

3. The fiber claimed in claim 1 having a chromatic dispersion slope at 1550 nm less than 0.07 ps/(nm$^2$.km).

4. The fiber claimed in claim 1 having a ratio between the effective surface area and the chromatic dispersion slope greater than or equal to 1000 $\mu m^2$.nm$^2$.km/ps.

5. The fiber claimed in claim 1 having a ratio between the effective surface area and the chromatic dispersion slope less than or equal to 5000 $\mu m^2$.nm$^2$.km/ps.

6. The fiber claimed in claim 1 having a chromatic dispersion cancellation wavelength less than or equal to 1 480 nm.

7. The fiber claimed in claim 1 having an effective surface area greater than or equal to 70 $\mu m^2$.

8. The fiber claimed in claim 1 having curvature losses at 1550 nm less than or equal to 0.05 dB for 100 turns of fiber wound with a radius of 30 mm.

9. The fiber claimed in claim 1 having a sensitivity to microcurvature less than 1.2.

10. The fiber claimed in claim 1 having a theoretical cut-off wavelength greater than 1550 nm.

11. The fiber claimed in claim 1 having an in-cable cut-off wavelength less than 1300 nm.

12. The fiber claimed in claim 1 having an attenuation at 1550 nm less than or equal to 0.23 dB/km.

13. The fiber claimed in claim 1 having a polarization modal dispersion less than or equal to 0.1 ps.km$^{-0.5}$.

14. The fiber claimed in claim 1 wherein the difference between the index of the central part of the fiber (step) and the index of the cladding is from $5\times10^{-3}$ to $9\times10^{-3}$.

15. The fiber claimed in claim 1 wherein the difference between the index of the intermediate segment between the step and the ring and the index of the cladding is from $-4\times10^{-3}$ to $1\times10^{-3}$.

16. The fiber according to claim 1 wherein the difference between the index of the ring and the index of the cladding is from $5\times10^{-4}$ to $5\times10^{-3}$.

17. The fiber claimed in claim 1 wherein the ratio between the radius of the step and the outside radius of the ring is from 0.23 to 0.45.

18. The fiber claimed in claim 1 wherein the ratio between the inside radius of the ring and the outside radius of the ring is from 0.45 to 0.75.

19. The fiber claimed in claim 1 wherein the outside radius of the ring is from 7 $\mu m$ to 13 $\mu m$.

20. A wavelength division multiplex fiber optic transmission system comprising a fiber as claimed in claim 1 as line fiber.

21. The transmission system claimed in claim 20 further comprising dispersion compensating fiber.

22. The fiber claimed in claim 1 having curvature losses at 1550 nm less than or equal to 0.005 dB for 100 turns of fiber wound with a radius of 30 mm.

23. The fiber claimed in claim 1 having a sensitivity to microcurvature less than 0.8.

24. The fiber claimed in claim 1 wherein the difference between the index of the central part of the fiber (step) and the index of the cladding is from $6\times10^{-3}$ to $7.5\times10^{-3}$.

25. The fiber claimed in claim 1 wherein the difference between the index of the intermediate segment between the step and the ring and the index of the cladding is from $-2.5\times10^{-3}$ to $5\times10^{-4}$.

26. The fiber according to claim 1 wherein the difference between the index of the ring and the index of the cladding is from $1\times10^{-3}$ to $3.5\times10^{-3}$.

27. The fiber claimed in claim 1 wherein the ratio between the inside radius of the ring and the outside radius of the ring is from 0.48 to 0.7.

28. The fiber claimed in claim 1 wherein the outside radius of the ring is from 7.5 $\mu m$ to 11.5 $\mu m$.

29. A in-cable monomode optical fiber having-a step, intermediate segment and ring index profile and, for a wavelength of 1,550 nm:
    an effective surface area greater than or equal to 60 $\mu m^2$,
    a chromatic dispersion from 3 to 14 ps/(nm.km),
    a chromatic dispersion slope from 0 to 0.1 ps/(nm$^2$.km), and
    a ratio between the effective surface area and the chromatic dispersion slope greater than 900 $\mu m^2$.nm$^2$.km/ps,
    wherein a cladding layer surrounds the ring, and the ring index is greater than the cladding layer index.

* * * * *